(12) United States Patent
Kobayashi et al.

(10) Patent No.: US 10,272,485 B2
(45) Date of Patent: Apr. 30, 2019

(54) METHOD FOR MANUFACTURING RING-SHAPED MEMBER

(71) Applicant: NSK Ltd., Shinagawa-ku, Tokyo (JP)

(72) Inventors: Kazuto Kobayashi, Fujisawa (JP); Yuu Yasuda, Fujisawa (JP)

(73) Assignee: NSK LTD., Tokyo (JP)

( * ) Notice: Subject to any disclaimer, the term of this patent is extended or adjusted under 35 U.S.C. 154(b) by 184 days.

(21) Appl. No.: 15/115,698

(22) PCT Filed: Feb. 12, 2015

(86) PCT No.: PCT/JP2015/000636
§ 371 (c)(1),
(2) Date: Aug. 1, 2016

(87) PCT Pub. No.: WO2015/122186
PCT Pub. Date: Aug. 20, 2015

(65) Prior Publication Data
US 2017/0173658 A1 Jun. 22, 2017

(30) Foreign Application Priority Data
Feb. 14, 2014 (JP) .................. 2014-026473

(51) Int. Cl.
*B21H 1/12* (2006.01)
*B21K 1/04* (2006.01)
*F16C 33/64* (2006.01)

(52) U.S. Cl.
CPC ............... *B21H 1/12* (2013.01); *B21K 1/04* (2013.01); *F16C 33/64* (2013.01)

(58) Field of Classification Search
CPC .............. B21H 1/12; B21K 1/04; F16C 33/64
See application file for complete search history.

(56) References Cited

U.S. PATENT DOCUMENTS
4,590,780 A 5/1986 Bachmann

FOREIGN PATENT DOCUMENTS
CN 102581204 A 7/2012
GB 330840 6/1930
(Continued)

OTHER PUBLICATIONS
Machine Translation for Tabata, JP 2000-167641 A.*
(Continued)

*Primary Examiner* — Christopher J Besler
*Assistant Examiner* — Christine Pellazar Bersabal
(74) *Attorney, Agent, or Firm* — Crowell & Moring LLP

(57) ABSTRACT

There is provided a method for manufacturing ring-shaped members at a good yield and high production efficiency. To achieve this object, the following is performed. A single (a sequence of) forging produces a joined body formed by radially coupling four cylindrical portions with different inner diameter sizes. A cylindrical member that has the largest inner diameter size and a cylindrical member that has the third largest inner diameter size after the forging are employed as ring-shaped members without change. A rolling process is performed on respective cylindrical member that has the smallest inner diameter size and cylindrical member that has the second largest inner diameter size to obtain ring-shaped members. Thus, two sets of ring-shaped members are obtained as two sets of inner rings and outer rings.

7 Claims, 8 Drawing Sheets

(56) References Cited

FOREIGN PATENT DOCUMENTS

| JP | 2000-167641 | A |   | 6/2000 |
|----|-------------|---|---|--------|
| JP | 2000167641  | A | * | 6/2000 |
| JP | 2002-205103 | A |   | 7/2002 |
| JP | 2002205103  | A | * | 7/2002 |
| JP | 2002-361361 | A |   | 12/2002 |
| JP | 2002361631  | A | * | 12/2002 |
| JP | 2005288505  | A | * | 10/2005 |
| JP | 2009-279627 | A |   | 12/2009 |
| JP | 2009279627  | A | * | 12/2009 |

OTHER PUBLICATIONS

Machine Translation for Cho, JP 2002-361361 A.*
Machine Translation for Hirase, JP 2002-205103 A.*
Machine Translation for Koyama, JP 2009-279627 A.*
International Search Report (PCT/ISA/210) issued in PCT Application No. PCT/JP2015/000636 dated Mar. 17, 2015 with English translation (5 pages).
Japanese-language Written Opinion (PCT/ISA/237) issued in PCT Application No. PCT/JP2015/000636 dated Mar. 17, 2015 (4 page).
Extended European Search Report issued in counterpart European Application No. 15749057.4 dated Mar. 27, 2017 (Seven (7) pages).
Chinese Office Action issued in counterpart Chinese Application No. 201580008165.6 dated Mar. 24, 2017 (six (6) pages).
International Preliminary Report of Patentability (PCT/IB/338 & PCT/IB/373) issued in PCT Application No. PCT/JP2015/000636 dated Aug. 25, 2016, including English translation of document C2 (Japanese-language Written Opinion (PCT/ISA/237), filed Aug. 1, 2016) (Seven (7) pages).

* cited by examiner

METHOD FOR MANUFACTURING RING-SHAPED MEMBER

TECHNICAL FIELD

The present invention relates to methods for manufacturing ring-shaped members, and, for example, relates to a method for manufacturing a ring-shaped member applied to an inner ring and an outer ring for a rolling bearing and a similar member.

BACKGROUND ART

There has been conventionally known a method for manufacturing two bearing rings (ring-shaped members), which are an inner ring and an outer ring for a rolling bearing, from one column-shaped material (so-called parent-child taking) (for example, see PTL 1). This manufacturing method includes the following first step to fifth step.

First step: through upsetting in hot working, a disk-shaped intermediate formed product 202 having an arc-shaped generating line of an outer circumferential surface illustrated in (b) of FIG. 14 is formed from a column-shaped material 201 illustrated in (a) of FIG. 14.

Second step: through closed die forging, a stepped cylindrically-shaped formed product 203 illustrated in (c) of FIG. 14 is formed from the intermediate formed product 202. In this formed product 203, an outer periphery on one end of a small-diameter inner ring 205 is coupled to an inner periphery on one end of a large-diameter outer ring 204. A bottom 206 is formed on an inner periphery on the other end of the inner ring 205.

Third step: the formed product 203 is cut at the coupled site of the outer ring 204 and the inner ring 205 to separate the formed product 203 into the outer ring 204 and the inner ring 205 as illustrated in (d) of FIG. 14.

Fourth step: as illustrated in (e) of FIG. 14, the bottom 206 is punched from the separated inner ring 205.

Fifth step: the outer ring 204 and the inner ring 205 are formed into a predetermined shape by a rolling process.

PTL 2 discloses the method of producing a ring-shaped member. In this method, a large-diameter cylindrical member and a small-diameter cylindrical member before cold rolling are made to have identical weights, and only the small-diameter cylindrical member is cold-rolled. Thus, the method produces a ring-shaped member with a diameter and a shape identical to those of the large-diameter cylindrical member (Since the large-diameter cylindrical member is not to be rolled, the large-diameter cylindrical member becomes the ring-shaped member without change).

The above-described PTL 1 discloses the method of producing a large-diameter cylindrical member and a small-diameter cylindrical member by a single forging process. The small-diameter cylindrical member is upset, and is then subject to a rolling process. Thus, in the method, the large-diameter cylindrical member in forging is produced to be a ring-shaped member serving as an inner ring, and the small-diameter cylindrical member in the forging is produced to be the ring-shaped member serving as an outer ring.

CITATION LIST

Patent Literature

PTL 1: JP 2009-279627 A
PTL 2: JP 2002-361361 A

SUMMARY OF INVENTION

Technical Problem

In the technique disclosed in PTL 1, however, firstly, to manufacture lots of cylindrical members with identical diameters at once, a diameter expansion rate when a cylindrical member with the smallest diameter is cold-rolled needs to be substantially large, and a crack may easily occur. This leaves room for improvement.

Secondly, cylindrical members other than the outermost cylindrical member always need to be cold-rolled. This causes a problem of necessitating lots of cold rolling processes, which takes much processing time (The rolling process needs to be performed three times for producing four ring-shaped members). That is, although forging a large number of pieces at once improves a yield, a degree of difficulty in the cold rolling process increases (The crack is likely to occur.) as the number of pieces to be produced increases, and also necessitating an increase in the number of processes. This leaves room for improvement.

The technique disclosed in PTL 2 is a method of ensuring a scrap produced through the inner diameter punching to have a smaller size than that of a scrap produced through a so-called conventional parent-child taking process. However, to finish the small-diameter cylindrical member as an outer ring by the rolling process, a large diameter expansion rate is needed, and may lead to a longer processing time for the rolling process. This also leaves room for improvement.

Especially, further cost reduction is demanded these years, so there is an increased demand for a method for higher productivity.

The present invention has been made to solve the above-described conventional techniques, and an object of the present invention is to provide a method for manufacturing ring-shaped members at a good yield and a high production efficiency.

Solution to Problem

To solve the problems, there is provided a method for manufacturing a ring-shaped member, including:

a forging step of forming a joined body from a round bar material, the joined body comprising a plurality of circular-shaped cylindrical portions coupled with each other;

a cutting and separating step of cutting and separating the joined body to obtain a plurality of cylindrical members; and a rolling step of expanding an inner diameter size of a part of the plurality of cylindrical members to obtain a ring-shaped member.

The joined body including a first cylindrical portion, a third cylindrical portion, a second cylindrical portion, and a fourth cylindrical portion, by radially coupling each other, the third cylindrical portion having an outer diameter size configured to be almost identical to an inner diameter size of the first cylindrical portion, the second cylindrical portion having an outer diameter size configured to be almost identical to an inner diameter size of the third cylindrical portion, the fourth cylindrical portion having an outer diameter size configured to be almost identical to an inner diameter size of the second cylindrical portion.

The rolling step includes expanding an inner diameter size of a third cylindrical member such that the third cylindrical member has an inner diameter size almost identical to an inner diameter size of a first cylindrical member to obtain a third ring-shaped member, and expanding an inner diameter size of a fourth cylindrical member such that the fourth cylindrical member has an inner diameter size almost identical to an inner diameter size of a second cylindrical member to obtain a fourth ring-shaped member.

Here, the method for manufacturing the ring-shaped member may be configured as follows. The forging step forms the joined body by radial coupling of one ends of a first cylindrical portion and a second cylindrical portion in an axial direction and the other ends of a third cylindrical portion and a fourth cylindrical portion in an axial direction.

The method for manufacturing the ring-shaped member may be configured as follows. The rolling step expands an inner diameter size of at least anyone of a third cylindrical member and a fourth cylindrical member while reducing a height of any one of the third cylindrical member and the fourth cylindrical member in an axial direction.

The method for manufacturing the ring-shaped member may be configured as follows. During the cutting and separating step or after the cutting and separating step, at least one of a third cylindrical member and a fourth cylindrical member is upset.

The method for manufacturing the ring-shaped member may be configured as follows. The rolling step includes a step of expanding an inner diameter size of a second cylindrical member.

Advantageous Effects of Invention

According to one aspect of the present invention, a method for manufacturing ring-shaped members at good yield and high production efficiency can be provided.

DESCRIPTION OF EMBODIMENTS

The following detailed description will describe specific details for complete understanding of embodiments of the present invention. However, it is apparent that one or more embodiments and aspects can be embodied even without the specific details. In addition, for simplification, the drawings abbreviate illustrations of well-known structures and devices.

Hereinafter, a method for manufacturing a ring-shaped member in some embodiment of the present invention will be described with reference to the drawings.

First Embodiment

Figure 1:
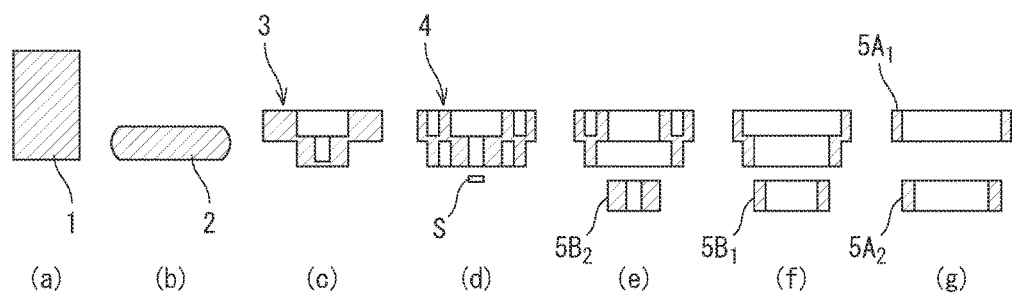
FIG. 1 illustrates cross-sectional views (a) to (g) of a processing outline of a ring-shaped member in a method for manufacturing the ring-shaped member in a first embodiment.

FIG. 1 illustrates cross-sectional views (a) to (g) of a processing outline of a ring-shaped member in a method for manufacturing the ring-shaped member in the first embodiment.

The method for manufacturing the ring-shaped member in the first embodiment includes a forging step ((a) to (d) of FIG. 1), a cutting and separating step ((e) to (g) of FIG. 1), and a rolling forming step. In the first embodiment, a special technical feature can be found in this forging step.

Forging Step

The forging step is a step of forming a joined body where plural circular-shaped cylindrical members, which are made of a round bar material, are coupled together.

First, a cut billet 2 illustrated in (b) of FIG. 1 is produced using a round bar member 1 illustrated in (a) of FIG. 1 in a method of any one of press cutting, saw cutting, or cutting off. At this time, the cut billet 2 cut out by the press cutting yields poor surface roughness on a cut surface. This may cause a crack or may produce poor squareness of the cut surface in an axial direction, and therefore the cut billet 2 is upset or an end surface of the cut billet 2 is corrected. The cut billet 2 produced by the saw cutting or the cutting off has good roughness on the cut surface and good squareness of the cut surface in the axial direction of the billet. Therefore, the upsetting and the end surface correction may not be performed.

Next, the cut billet 2 is forged to obtain an intermediate formed body 3 as illustrated in (c) of FIG. 1. Then, a joined body 4, which is as illustrated in (d) of FIG. 1, is formed by coupling a first cylindrical portion $4A_1$, a second cylindrical portion $4B_1$, a third cylindrical portion $4A_2$, and a fourth cylindrical portion $4B_2$ in a radial direction.

Joined Body

Figure 2:
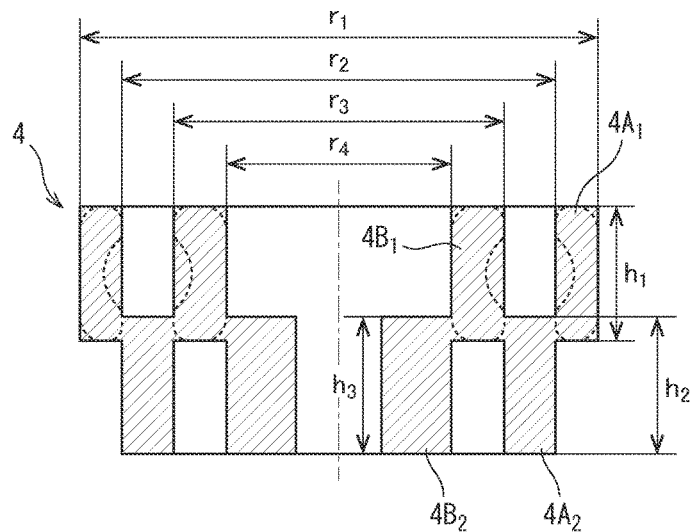
FIG. 2 illustrates a cross-sectional view of a configuration of a joined body after a forging step in the method for manufacturing the ring-shaped member in the first embodiment.
Figure 3:
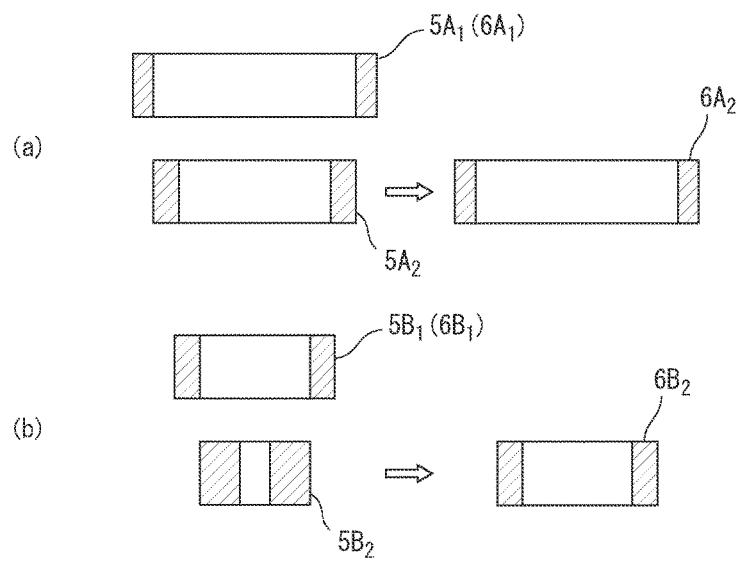
FIG. 3 illustrates cross-sectional views of configurations of cylindrical members and the ring-shaped members before and after a rolling step in the method for manufacturing the ring-shaped member in the first embodiment.

As illustrated in FIG. 2, in the joined body 4, an outer diameter size $r_2$ of the third cylindrical portion $4A_2$ is configured to be almost identical to an inner diameter size $r_2$ of the first cylindrical portion $4A_1$. An outer diameter size $r_3$ of the second cylindrical portion $4B_1$ is configured to be almost identical to an inner diameter size $r_3$ of the third cylindrical portion $4A_2$. An outer diameter size $r_4$ of the fourth cylindrical portion $4B_2$ is configured to be almost identical to an inner diameter size $r_4$ of the second cylindrical portion $4B_1$.

One ends of the first cylindrical portion $4A_1$ and the second cylindrical portion $4B_1$ in the axial direction are radially coupled to the other ends of the third cylindrical portion $4A_2$ and the fourth cylindrical portion $4B_2$ in the axial direction. The respective inner diameter sizes and outer diameter sizes of the first cylindrical portion $4A_1$, the second cylindrical portion $4B_1$, the third cylindrical portion $4A_2$, and the fourth cylindrical portion $4B_2$ are configured to include machining allowances for a cutting and separating step, which will be described later, in a size of a rolling bearing as a product.

An outer diameter size $r_1$ of the first cylindrical portion $4A_1$, the outer diameter size of the third cylindrical portion $4A_2$ (the inner diameter size of the first cylindrical portion $4A_1$) $r_2$, the outer diameter size of the second cylindrical portion $4B_1$ (the inner diameter size of the third cylindrical portion $4A_2$) $r_3$, the outer diameter size of the fourth cylindrical portion $4B_2$ (the inner diameter size of the second cylindrical portion $4B_1$) $r_4$, a height size $h_1$ of the first cylindrical portion $4A_1$, and the height size $h_1$ of the second cylindrical portion $4B_1$ are restricted by product sizes.

A weight of the first cylindrical portion $4A_1$ is configured to be almost identical to a weight of the third cylindrical portion $4A_2$. A weight of the second cylindrical portion $4B_1$ is configured to be almost identical to a weight of the fourth cylindrical portion $4B_2$.

Thus, the joined body 4 is configured such that the fourth cylindrical portion $4B_2$, the second cylindrical portion $4B_1$, the third cylindrical portion $4A_2$, and the first cylindrical portion $4A_1$ continuously in this order from the inner diameter side. This ensures an efficient forming process with the four cylindrical portions coupled in the forging. The parts corresponding to the respective cylindrical portions are configured in a stepwise manner, because a cut length can be shortened and a cylindrical member 5, which is produced by separation in the cutting and separating step described later, can be easily punched.

Cutting and Separating Step

As illustrated in (e) to (g) of FIG. 1, the cutting and separating step is a step of cutting and separating the four cylindrical portions $4A_1$, $4B_1$, $4A_2$, and $4B_2$ to obtain respective four cylindrical members $5A_1$, $5B_1$, $5A_2$, and $5B_2$. In the cutting and separating, the plural cylindrical portions may be cut and separated in one step, or an inner diameter punching step may be performed simultaneously with the cutting and separating step.

Rolling Process Step

The rolling step is a step of expanding the inner diameter sizes of parts of the plural cylindrical members produced through the cutting and separating step. Specifically, the rolling step is a step of employing the first cylindrical member $5A_1$ and the second cylindrical member $5B_1$ as ring-shaped members $6A_1$ and $6B_1$ without change, and rolling the third cylindrical member $5A_2$ and the fourth cylindrical member $5B_2$ with a well-known rolling mill to expand the inner diameter sizes. This rolling step expands the inner diameter size of the third cylindrical member $5A_2$ so as to make the inner diameter size almost identical to that of the first cylindrical member $5A_1$, and produce a third ring-shaped member $6A_2$. Additionally, the inner diameter size of the fourth cylindrical member $5B_2$ is expanded so as to make the inner diameter size almost identical to that of the second cylindrical member $5B_1$, and produce a fourth ring-shaped member $6B_2$.

Thus, as the ring-shaped members for outer rings, two ring-shaped members 6, the first ring-shaped member $6A_1$, and the third ring-shaped member $6A_2$ can be produced. As the ring-shaped members for inner rings, the two ring-shaped members 6, the second ring-shaped member $6B_1$, and the fourth ring-shaped member $6B_2$ can be produced.

With the method for manufacturing the ring-shaped member according to the embodiment, as illustrated in (d) of FIG. 1, the number of scraps S, which are generated when the inner diameters are punched in the forging step, is only one for every four cylindrical portions. This substantially improves a yield compared with one piece of scrap generated for every two cylindrical portions by a so-called conventional "parent-child taking process". Similarly, the yield can be substantially improved as compared to PTL 1 and PTL 2.

To produce two sets of the two ring-shaped members with identical sizes, since a difference in size between the first cylindrical portion $4A_1$ and the third cylindrical portion $4A_2$, and a difference in size between the second cylindrical portion $4B_1$ and the fourth cylindrical portion $4B_2$ are small, the diameter expansion rate in the cold rolling process can be made small. Consequently, the four cylindrical members (the ring-shaped members) can be manufactured without a possibility of a crack. The small diameter expansion rate provides an effect of shortening the processing time, accordingly.

To produce the four ring-shaped members 6 (two for each of the inner and the outer rings), performing the rolling process twice is sufficient. This configuration brings an effect of reducing the number of the steps in the rolling process, which especially takes much processing time.

Second Embodiment

Figure 4:
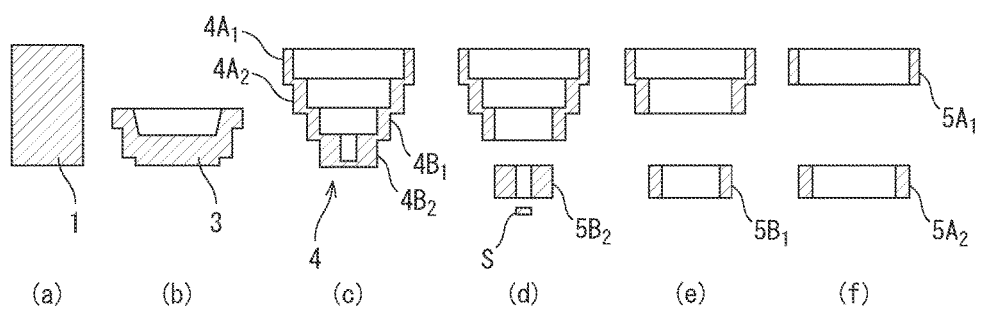
FIG. 4 illustrates cross-sectional views (a) to (f) of a processing outline of the ring-shaped member in a method for manufacturing the ring-shaped member in a second embodiment.

A method for manufacturing a ring-shaped member in the second embodiment will be described with reference to the drawings. In the second embodiment, the configuration of the joined body is different from the first embodiment. Therefore, like reference numerals designate corresponding or identical elements throughout the above-described embodiment and the second embodiment, and such elements may be omitted. FIG. 4 illustrates cross-sectional views (a) to (f) of a processing outline of a ring-shaped member in a method for manufacturing the ring-shaped member in the second embodiment.

As illustrated in (a) to (f) of FIG. 4, in the first embodiment, the plural cylindrical portions included in the joined body 4 are axially coupled in the ascending order of inner diameters. Specifically, below the first cylindrical portion $4A_1$, the second cylindrical portion $4B_1$, which has the inner diameter size larger than the inner diameter size of the first cylindrical portion $4A_1$, is concentrically coupled. Furthermore, below the second cylindrical portion $4B_1$, the third cylindrical portion $4A_2$, which has the inner diameter size larger than the inner diameter size of the second cylindrical portion $4B_1$, is concentrically coupled. Subsequently, as they are arranged lower, below a cylindrical portion having a larger inner diameter size is concentrically coupled with another cylindrical portion than a smaller inner diameter size.

In the second embodiment, the joined body 4 having such a configuration eliminates a need for a thin mold, when compared with the shape of the first embodiment, and provides an effect of improvement in product life of the mold.

Third Embodiment

Figure 5:
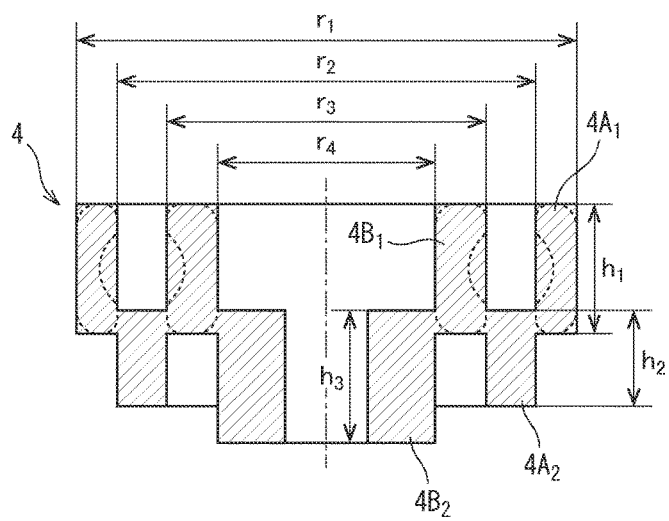
FIG. 5 illustrates a cross-sectional view of a configuration of a joined body after a forging step in a method for manufacturing a ring-shaped member in a third embodiment.
Figure 6:
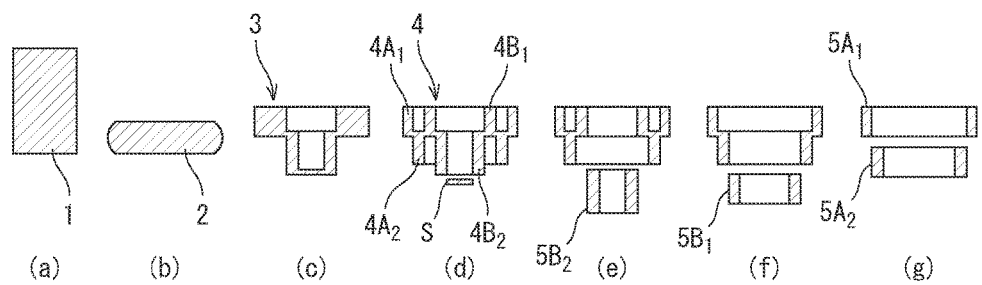
FIG. 6 illustrates cross-sectional views (a) to (g) of a processing outline of the ring-shaped member in the method for manufacturing the ring-shaped member in the third embodiment.
Figure 7:
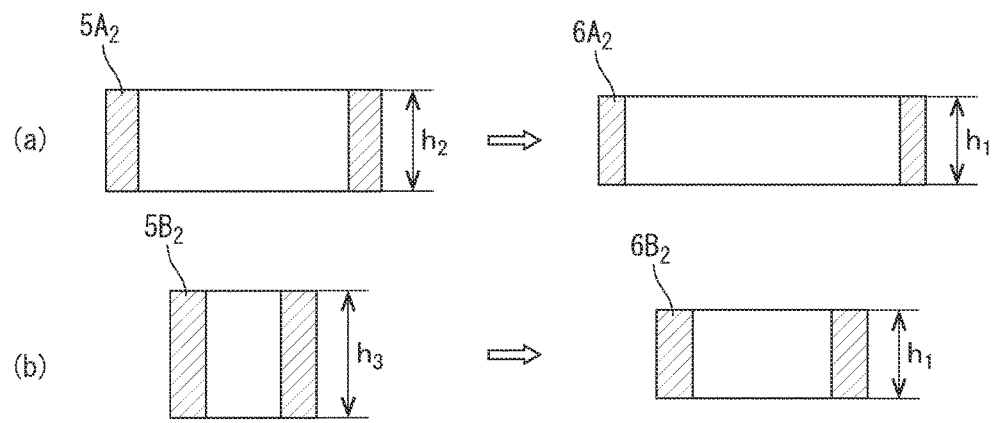
FIG. 7 illustrates cross-sectional views of configurations of cylindrical members and the ring-shaped members before and after a rolling step in the method for manufacturing the ring-shaped member in the third embodiment.
Figure 8:
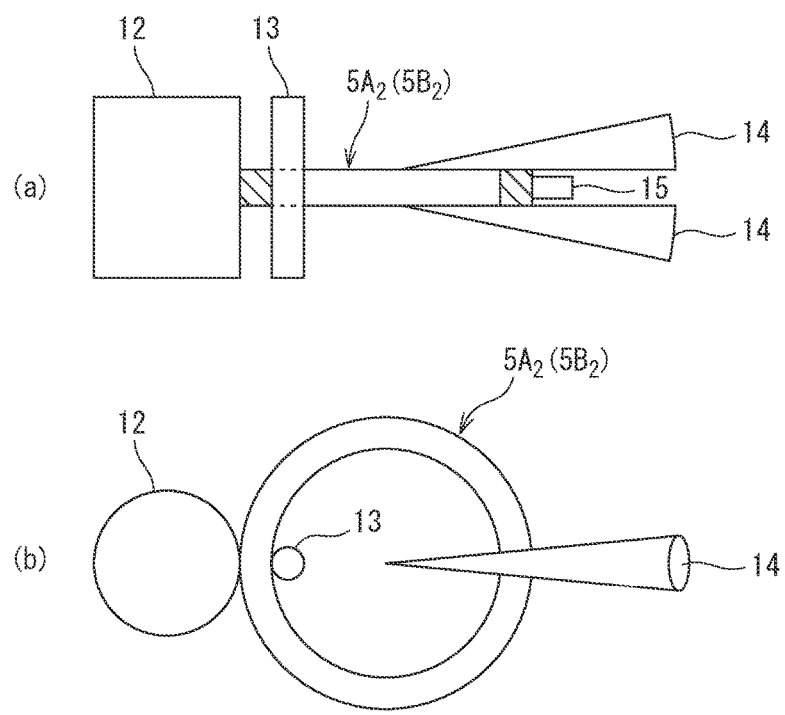
FIG. 8 illustrates schematic views (a) and (b) of a processing outline of a rolling step in a method for manufacturing a ring-shaped member in one variation of the third embodiment.

A method for manufacturing a ring-shaped member in the third embodiment will be described with reference to the drawings. In the thirds embodiment, the rolling process is different from the first embodiment. Therefore, like reference numerals designate corresponding or identical elements throughout the above-described embodiments and the third embodiment, and therefore such elements may be omitted. FIG. 5 illustrates a cross-sectional view of a configuration of a joined body after a forging step in a method for manufacturing a ring-shaped member in the third embodiment. FIG. 6 illustrates cross-sectional views (a) to (g) of a processing outline of the ring-shaped member in the method for manufacturing the ring-shaped member in the third embodiment. FIG. 7 illustrates cross-sectional views of configurations of cylindrical members and the ring-shaped members before and after the rolling step in the method for manufacturing the ring-shaped member according to the third embodiment. FIG. 8 illustrates schematic views (a) and (b) of a processing outline of a rolling step in a method for manufacturing a ring-shaped member in one variation of the third embodiment.

As illustrated in FIG. 5, in the joined body 4 in the third embodiment, the height dimension (an axial dimension) $h_1$ of the first cylindrical portion $4A_1$, a height dimension $h_2$ of the third cylindrical portion $4A_2$, and a height dimension $h_3$ of the fourth cylindrical portion $4B_2$ meet a relationship of $h_2 > h_1$ and $h_2 < h_3$. The height dimension $h_1$ of the second cylindrical portion $4B_1$ is assumed to be identical to the height dimension $h_1$ of the first cylindrical portion $4A_1$.

In the above-described first and second embodiments, the four ring-shaped members 6 are obtainable while the height dimensions hardly change in the rolling step.

However, the actual dimensions of the ring-shaped members 6 as bearing rings (the inner rings and the outer rings) for rolling bearings are determined as a product. Therefore, even if the forging step performs the four-piece forming, the height dimensions often have the relationship as illustrated in FIG. 5.

This often results in $h_2 > h_1$ when attempting to make a weight of the cylindrical portion $4A_1$, which will be the ring-shaped member $6A_1$, and a weight of the cylindrical portion $4A_2$, which will be the ring-shaped member $6A_2$, to be identical. Similarly, this often results in $h_3 > h_1$ when attempting to make a weight of the cylindrical portion $4B_1$, which will be the ring-shaped member $6B_1$, and a weight of the cylindrical portion $4B_2$, which will be the ring-shaped member $6B_2$, to be identical.

In the third embodiment, a rolling step that expands the inner diameter size of at least any one of the third cylindrical member $4A_2$ or the fourth cylindrical member $4B_2$ while reducing the height dimension is included, in the case where the respective height dimensions of the cylindrical portions $4A_1$, $4A_2$, $4B_1$, and $4B_2$ meet at least any one of $h_2 > h_1$ or $h_3 > h_1$.

As a modification of the third embodiment, the cutting and separating step may upset the cylindrical portions $4A_1$, $4A_2$, $4B_1$, and $4B_2$ so as to each have the identical height dimension. In the case where the respective height dimensions of the cylindrical portions $4A_1$, $4A_2$, and $4B_1$ meet $h_2 < h_1$, the height dimensions can be extended without restraining the height dimensions up to a predetermined dimension in the rolling step.

Specifically, as "the forging step", firstly, the cut billet 2 illustrated in (b) of FIG. 6 is produced by using the round bar member 1 illustrated in (a) of FIG. 6 in any of methods of the press cutting, the saw cutting, or the cutting off.

Next, the cut billet 2 is forged to produce the intermediate formed body 3 as illustrated in (c) of FIG. 6. Then, the joined body 4, which is as illustrated in (d) of FIG. 6, is formed by radial coupling of the first cylindrical portion $4A_1$, the second cylindrical portion $4B_1$, the third cylindrical portion $4A_2$, and the fourth cylindrical portion $4B_2$. Here, as described above, in the joined body 4 in the third embodiment, since the height dimension $h_2$ of the third cylindrical portion $4A_2$ is shorter than the height dimension $h_3$ of the fourth cylindrical portion $4B_2$, an end surface of the fourth cylindrical portion $4B_2$ in the axial direction projects with respect to an end surface of the third cylindrical portion $4A_2$ in the axial direction.

Subsequently, as illustrated in (e) to (g) of FIG. 6, "the cutting and separating step" according to the embodiment cut and separate the four cylindrical portions $4A_1$, $4B_1$, $4A_2$, and $4B_2$ to obtain the respective four cylindrical members $5A_1$, $5B_1$, $5A_2$, and $5B_2$.

Next, "the rolling step" in the third embodiment employs the first cylindrical member $5A_1$ and the second cylindrical member $5B_1$ as the ring-shaped members $6A_1$ and $6B_1$ without change and performs the rolling process on the third cylindrical member $5A_2$ and the fourth cylindrical member $5B_2$ with the well-known rolling mill to expand the inner diameter sizes. Then, the rolling process of expanding the inner diameter sizes of at least any one of the third cylindrical member $5A_2$ and the fourth cylindrical member $5B_2$ is performed while reducing the axial heights.

Here, in the rolling step, a rolling mill that includes an axial roll disclosed in JP 2002-205103 A can be used. Specifically, as illustrated in (a) and (b) of FIG. 8, the rolling mill that includes a main roll 12, a mandrel 13, axial rolls 14, and a tracer roll 15 can be used. The main roll 12 is secured and has a function to rotate the cylindrical member $5A_2$ ($5B_2$), which is a rolled material, at a constant outer circumferential speed while rotating itself at a constant speed. The mandrel 13 is driven and disposed at the inner diameter side of the cylindrical member $5A_2$ ($5B_2$). The mandrel 13 sandwiches the cylindrical member $5A_2$ ($5B_2$) with the main roll 12 and moves in the main roll 12 direction to press the cylindrical member $5A_2$ ($5B_2$) in a thickness direction.

The axial rolls 14 are generally positioned symmetrically with respect to centers of the main roll 12 and the cylindrical member $5A_2$ ($5B_2$), and conical-shaped rolls re arranged on the upper and lower side to sandwich the cylindrical member $5A_2$ ($5B_2$). One or both of the rolls are driven, and usually, the upper roll moves downward to press the cylindrical member $5A_2$ ($5B_2$) in a height direction. The axial rolls 14 are formed into the cone shape because a peripheral velocity of the cylindrical member $5A_2$ ($5B_2$) differs between the inner circumferential side and the outer circumferential side (the inner circumferential side< the outer circumferential side). Therefore, the difference in the circumferential velocity can be absorbed. Accordingly, the axial rolls 14 are disposed such that the distal ends of the conical-shaped rolls match the center of the cylindrical member $5A_2$ ($5B_2$). This horizontally (a diameter-expanding side) moves a pressing position of roll circumferential surfaces with respect to the cylindrical member $5A_2$ ($5B_2$) as the diameter of the cylindrical member $5A_2$ ($5B_2$) expands.

The tracer roll 15 rollingly contacts the outer circumferential surface of the cylindrical member $5A_2$ ($5B_2$) at a position where the main roll 12 and the cylindrical member $5A_2$ ($5B_2$) are symmetrical with respect to their centers. Bt the movement of the tracer roll 15, the outer diameter size of the cylindrical member $5A_2$ ($5B_2$) can be considered to be respective dimensions between rolling contact surfaces of the tracer roll 15 and the main roll 12 with respect to the rolled material.

The rolling mill configured as described above radially rolls the cylindrical member $5A_2$ ($5B_2$) by the main roll 12 and the mandrel 13 while detecting the diameter of the cylindrical member $5A_2$ ($5B_2$) by the tracer roll 15. Thus, the rolling mill rolls the cylindrical member $5A_2$ ($5B_2$) in the height direction of the cylindrical member $5A_2$ ($5B_2$) and in the axial direction with the axial rolls 14, which are disposed on the upper side and lower side.

Thus, as the ring-shaped members for outer rings, the two ring-shaped members 6, the first ring-shaped member $6A_1$, and the third ring-shaped member $6A_2$ can be produced. As the ring-shaped members for inner rings, the two ring-shaped members 6, the second ring-shaped member $6B_1$, and the fourth ring-shaped member $6B_2$ can be produced. Especially, in the third embodiment, the rolling step expands the inner diameter size of at least any one of the third cylindrical member $5A_2$ or the fourth cylindrical member $5B_2$, while reducing the height dimension. This ensures performing the forging step without considering the height dimension.

Fourth Embodiment

Figure 9:
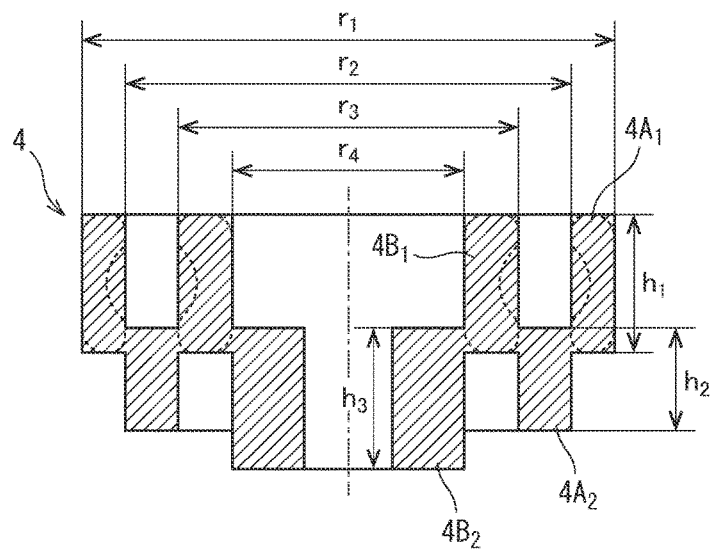
FIG. 9 illustrates a cross-sectional view of a configuration of a joined body after a forging step in a method for manufacturing a ring-shaped member in a fourth embodiment.

A method for manufacturing a ring-shaped member in the fourth embodiment will be described with reference to the drawings. In the fourth embodiment, the cutting and separating step is different from the third embodiment. Therefore, like reference numerals designate corresponding or identical elements throughout the above-described embodiments and the fourth embodiment, and such elements may be omitted. As illustrated in FIG. 9, in the joined body 4 used in the fourth embodiment, the height dimension (the axial dimension) $h_1$ of the first cylindrical portion $4A_1$, the height dimension $h_2$ of the third cylindrical portion $4A_2$, and the height dimension $h_3$ of the fourth cylindrical portion $4B_2$ meet a relationship of $h_2 > h_1$ and $h_2 < h_3$. The height dimension $h_1$ of the second cylindrical portion $4B_1$ is assumed to be identical to the height dimension $h_1$ of the first cylindrical portion $4A_1$.

In the fourth embodiment, a rolling step of expanding the inner diameter size of at least any one of the third cylindrical member $4A_2$ or the fourth cylindrical member $4B_2$ is included while reducing the height dimension simultaneously or separately, when the third cylindrical member $5A_2$ and the fourth cylindrical member $5B_2$ to be subject to the rolling process are cut and separated from the joined body 4.

Figure 10:
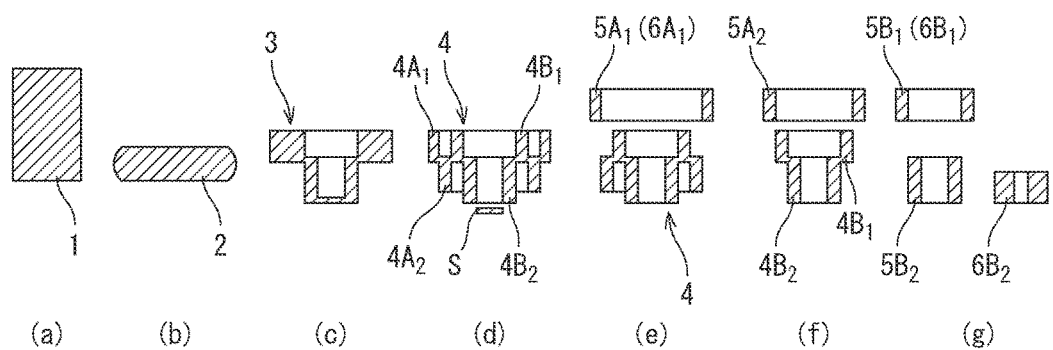
FIG. 10 illustrates cross-sectional views (a) to (g) of a processing outline of a ring-shaped member in the method for manufacturing the ring-shaped member in the fourth embodiment.

Specifically, as "the forging step", the cut billet 2 illustrated in (b) of FIG. 10 is produced by using the round bar member 1 illustrated in (a) of FIG. 10 in any of methods of the press cutting, the saw cutting, or the cutting off.

Next, the cut billet 2 is forged to produce the intermediate formed body 3 as illustrated in (c) of FIG. 10. Then, the joined body 4 illustrated in (d) of FIG. 10 is formed by radial coupling of the first cylindrical portion $4A_1$, the second cylindrical portion $4B_1$, the third cylindrical portion $4A_2$, and the fourth cylindrical portion $4B_2$. Here, as described above, in the joined body 4 in the fourth embodiment, since the height dimension $h_2$ of the third cylindrical portion $4A_2$ is shorter than the height dimension $h_3$ of the fourth cylindrical portion $4B_2$, an end surface of the fourth cylindrical portion $4B_2$ in the axial direction projects with respect to an end surface of the third cylindrical portion $4A_2$ in the axial direction.

Subsequently, as illustrated in (e) to (g) of FIG. 10, in "the cutting and separating step" in the fourth embodiment, the four cylindrical portions $4A_1$, $4B_1$, $4A_2$, and $4B_2$ are cut and separated to obtain the respective four cylindrical members $5A_1$, $5B_1$, $5A_2$, and $5B_2$.

Figure 11:
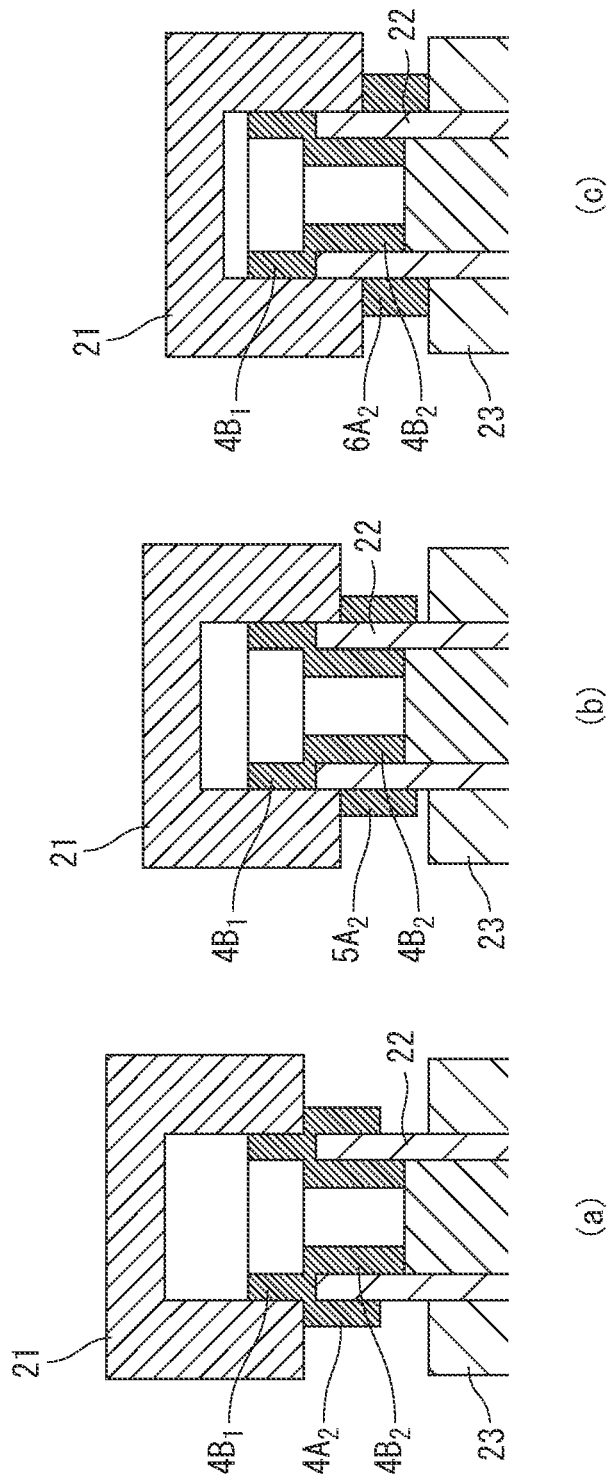
FIG. 11 illustrates cross-sectional views (a) to (c) of a processing outline of a cutting and separating step in a method for manufacturing a ring-shaped member in one variation of the fourth embodiment.

Here, as illustrated in (e) of FIG. 10, in the fourth embodiment, the cylindrical member $5A_2$ is separated from a joined body 4' from which the cylindrical member $5A_1$ has been cut and separated, and is also upset. Specifically, as illustrated in (a) of FIG. 11, the joined body 4' from which the cylindrical member $5A_1$ has been cut and separated is installed to an upsetting die 23, which is provided with a circular separation die 22. The separation die 22 contacts bottom surfaces of the cylindrical portion $4B_1$, the inner circumferential surfaces of the cylindrical portion $4A_2$, and the outer circumferential surfaces of the cylindrical portion $4B_2$. Thereafter, as illustrated in (b) of FIG. 11, a circular punch 21, which contacts the outer circumferential surfaces of the cylindrical portion $4B_1$ and the top surfaces of the cylindrical portion $4A_2$, presses to the joined body 4' to separate the cylindrical member $5A_2$. As illustrated in (c) of FIG. 11, the punch 21 upsets the cylindrical member $5A_2$ to configure the height dimension $h_1$ from $h_3$, thus obtaining the ring-shaped member $6A_2$.

In the fourth embodiment, the cylindrical portion $4A_2$ may be separated and upset independently. However, the simultaneous separation and upset reduce the number of the processes.

Thus, in the fourth embodiment, by upsetting the cylindrical members $5A_2$ and $5B_2$ in the cutting and separating step, the height dimensions of the cylindrical members $5A_1$ and $5B_1$ can be identical before the rolling step. Consequently, in the rolling step in the fourth embodiment, only the dimension of the diameter can be expanded without reducing the height dimension. This configuration achieves the rolling step with simpler facilities without an axial roll.

Fifth Embodiment

A method for manufacturing a ring-shaped member in the fifth embodiment will be described with reference to the drawings. In the fifth embodiment, only the rolling step is different from the third embodiment and the fourth embodiment. Therefore, like reference numerals designate corresponding or identical elements throughout the above-described embodiments and the fifth embodiment, and such elements may be omitted.

Figure 12:
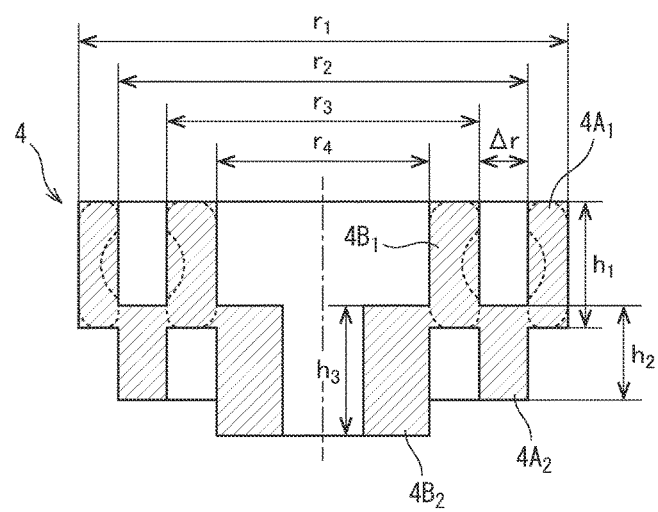
FIG. 12 illustrates a cross-sectional view of a configuration of a joined body after a forging step in a method for manufacturing a ring-shaped member in a fifth embodiment.

In the third embodiment and the fourth embodiment, the cylindrical member $5A_2$ is configured to have the height dimension $h_2$ to adjust its shape. However, depending on the dimension of the ring-shaped member $6A_2$, there is a small difference $\Delta r$ (see FIG. 12) between the inner diameter ($r_3$) and the outer diameter ($r_2$) of the cylindrical portion $4A_2$, and the ring-shaped member $6A_2$ may have a thin wall in the radial direction and may be large in the height direction. Consequently, when the height dimension of the cylindrical member $5A_2$ is reduced or when the cylindrical member $5A_2$ is subject to the rolling while reducing the height dimension, the cylindrical member $5A_2$ may buckle.

In the fifth embodiment, therefore, the outer diameter size of the ring-shaped member $6B_1$ is configured to be larger than the outer diameter size $r_3$ of the cylindrical portion $4B_1$, and the cylindrical member $5B_1$ is also subject to the rolling process. Thus, through the expansion of the diameter, the dimensions of the ring-shaped member $6B_1$ as a product are finished to have predetermined dimensions.

Figure 13:
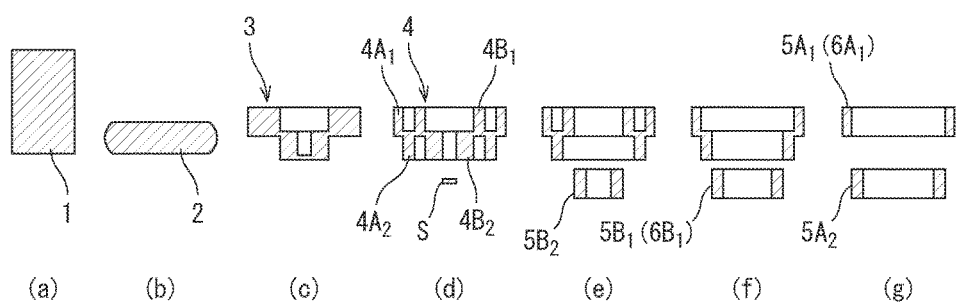
FIG. 13 illustrates cross-sectional views (a) to (g) of a processing outline of the ring-shaped member in the method for manufacturing the ring-shaped member in the fifth embodiment.
Figure 14:
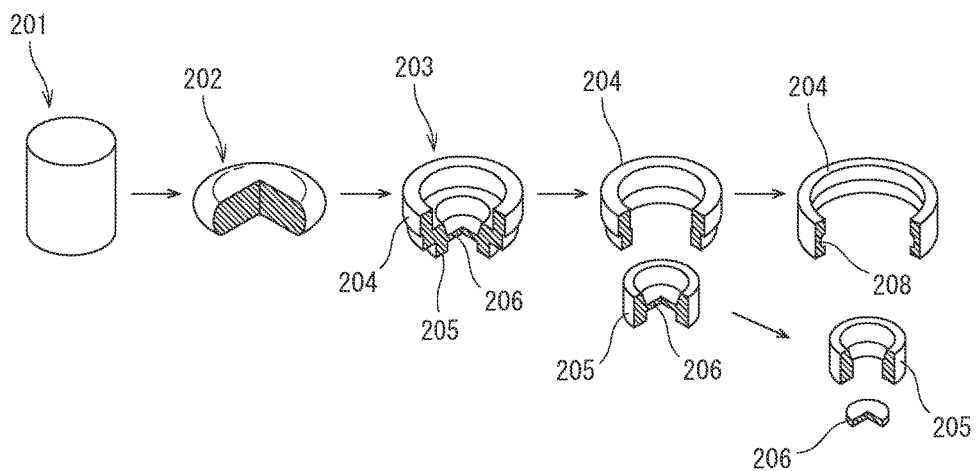
FIG. 14 illustrates cross-sectional views of a processing outline of ring-shaped members in a conventional method for manufacturing the ring-shaped member.

Specifically, as "the forging step", the cut billet 2 illustrated in (b) of FIG. 13 is produced by using the round bar member 1 illustrated in (a) of FIG. 13 in any of methods of the press cutting, the saw cutting, or the cutting off.

Next, the cut billet 2 is forged to obtain the intermediate formed body 3 as illustrated in (c) of FIG. 13. Then, the joined body 4 illustrated in (d) of FIG. 13 is formed by radial coupling of the first cylindrical portion $4A_1$, the second cylindrical portion $4B_1$, the third cylindrical portion $4A_2$, and the fourth cylindrical portion $4B_2$.

Subsequently, as illustrated in (e) to (g) of FIG. 13, in "the cutting and separating step" in the fifth embodiment, the four cylindrical portions $4A_1$, $4B_1$, $4A_2$, and $4B_2$ is cut and separated to obtain the respective four cylindrical members $5A_1$, $5B_1$, $5A_2$, and $5B_2$.

Next, in "the rolling step" in the fifth embodiment, the first cylindrical member $5A_1$ is used as the ring-shaped member $6A_1$ without change, and the rolling is performed on the second cylindrical member $5B_1$, the third cylindrical member $5A_2$, and the fourth cylindrical member $5B_2$ with the well-known rolling mill to expand the inner diameter sizes. That is, unlike the above-described embodiments, the rolling process is performed on the second cylindrical member $5B_1$ to expand the inner diameter to produce the ring-shaped member $6B_1$. The rolling process is performed on the fourth cylindrical member $5B_2$ to expand the inner diameter size so as to have the inner diameter size identical to that of the second cylindrical member $5B_1$. Thus, the ring-shaped member $6B_2$ is produced.

Thus, as the ring-shaped members for outer rings, the two ring-shaped members 6, the first ring-shaped member $6A_1$, and the third ring-shaped member $6A_2$ can be obtained. As the ring-shaped members for inner rings, the two ring-shaped members 6, the second ring-shaped member $6B_1$, and the fourth ring-shaped member $6B_2$ can be obtained. Especially, in the fifth embodiment, even if the rolling process is performed on the second cylindrical member $5B_1$, when compared with the third cylindrical member $5A_2$ and the fourth cylindrical member $5B_2$, the diameter can be expanded by only a slight amount. Accordingly, the processing time taken for the rolling process on the second cylindrical member $5B_1$ can be small.

Accordingly, while a loss of productivity is minimized, the scraps S generated through the inner diameter punch in the forging step are the one scrap S for every four ring-shaped members. This contributes to a good yield, which is advantageous of the four-piece forming process.

Although the present invention has been described with reference to the specific embodiments, this does not intend to limit the invention by the explanations. The person skilled in the art clearly understands various modifications of the disclosed embodiments and other embodiments of the present invention through reference of the descriptions of the present invention. Accordingly, it should be understood that the claims also cover these modifications or embodiments included in the scope and the gist of the present invention.

REFERENCE SIGNS LIST 1 round bar member
2 cut billet
3 intermediate formed body
4 joined body
$4A_1$ first cylindrical portion
$4B_1$ second cylindrical portion
$4A_2$ third cylindrical portion
$4B_2$ fourth cylindrical portion
5 cylindrical member
$5A_1$ first cylindrical member
$5B_1$ second cylindrical member
$5A_2$ third cylindrical member
$5B_2$ fourth cylindrical member
6 ring-shaped member
$6A_1$ first ring-shaped member
$6B_1$ second ring-shaped member
$6A_2$ third ring-shaped member
$6B_2$ fourth ring-shaped member

The invention claimed is:

1. A method for manufacturing a ring-shaped member, comprising:

a forging step of forming a joined body from a round bar material, the joined body comprising a plurality of circular-shaped cylindrical portions coupled with each other;

a cutting and separating step of cutting and separating the joined body to obtain a plurality of cylindrical members; and a rolling step of expanding an inner diameter size of a part of the plurality of cylindrical members to obtain a ring-shaped member, wherein the joined body comprising a first cylindrical portion, a third cylindrical portion, a second cylindrical portion, and a fourth cylindrical portion, by radially coupling each other, the third cylindrical portion having an outer diameter size configured to be identical to an inner diameter size of the first cylindrical portion, the second cylindrical portion having an outer diameter size configured to be identical to an inner diameter size of the third cylindrical portion, the fourth cylindrical portion having an outer diameter size configured to be identical to an inner diameter size of the second cylindrical portion, the rolling step comprises expanding an inner diameter size of a third cylindrical member such that the third cylindrical member has an inner diameter size identical to an inner diameter size of a first cylindrical member to obtain a third ring-shaped member, and expanding an inner diameter size of a fourth cylindrical member such that the fourth cylindrical member has an inner diameter size identical to an inner diameter size of a second cylindrical member to obtain a fourth ring-shaped member, and wherein the forging step comprises forming the joined body by radially coupling of a bottom end of an inner surface of the first cylindrical portion and an upper end of an outer surface of the third cylindrical portion, an upper end of an inner surface of the third cylindrical portion and a bottom end of an outer surface of the second cylindrical portion, and a bottom end of an inner surface of the second cylindrical portion and an upper end of an outer surface of the fourth cylindrical portion.

2. The method for manufacturing the ring-shaped member according to claim 1, wherein the rolling step includes expanding an inner diameter size of at least one of the third cylindrical member or the fourth cylindrical member while reducing a height of one of the third cylindrical member and/or fourth cylindrical member in an axial direction.

3. The method for manufacturing the ring-shaped member according to claim 1,
wherein during the cutting and separating step or after the cutting and separating step, at least one of the third cylindrical member and the fourth cylindrical member is upset.

4. The method for manufacturing the ring-shaped member according to claim 1,
wherein the rolling step includes a step of expanding an inner diameter size of the second cylindrical member.

5. The method for manufacturing the ring-shaped member according to claim 2,
wherein the rolling step includes a step of expanding an inner diameter size of the second cylindrical member.

6. The method for manufacturing the ring-shaped member according to claim 3,
wherein the rolling step includes a step of expanding an inner diameter size of the second cylindrical member.

7. A method for manufacturing a bearing, the method comprising:
a forging step of forming a joined body from a round bar material, the joined body comprising a plurality of circular-shaped cylindrical portions coupled with each other;
a cutting and separating step of cutting and separating the joined body to obtain a plurality of cylindrical members; and
a rolling step of expanding an inner diameter size of a part of the plurality of cylindrical members to obtain a ring-shaped member,
wherein the joined body comprising a first cylindrical portion, a third cylindrical portion, a second cylindrical portion, and a fourth cylindrical portion, by radially coupling each other, the third cylindrical portion having an outer diameter size configured to be identical to an inner diameter size of the first cylindrical portion, the second cylindrical portion having an outer diameter size configured to be identical to an inner diameter size of the third cylindrical portion, the fourth cylindrical portion having an outer diameter size configured to be identical to an inner diameter size of the second cylindrical portion, the rolling step comprises expanding an inner diameter size of a third cylindrical member such that the third cylindrical member has an inner diameter size identical to an inner diameter size of a first cylindrical member to obtain a third ring-shaped member, and expanding an inner diameter size of a fourth cylindrical member such that the fourth cylindrical member has an inner diameter size identical to an inner diameter size of a second cylindrical member to obtain a fourth ring-shaped member, and wherein the forging step comprises forming the joined body by radially coupling of a bottom end of an inner surface of the first cylindrical portion and an upper end of an outer surface of the third cylindrical portion, an upper end of an inner surface of the third cylindrical portion and a bottom end of an outer surface of the second cylindrical portion, and a bottom end of an inner surface of the second cylindrical portion and an upper end of an outer surface of the fourth cylindrical portion.

* * * * *